United States Patent [19]

Suzuki

[11] Patent Number: 5,125,705
[45] Date of Patent: Jun. 30, 1992

[54] CONSTRUCTION FOR MOUNTING AN AUTOMOBILE BUMPER

[75] Inventor: Mutsuo Suzuki, Shizuoka, Japan

[73] Assignee: Suzuki Motor Corporation, Shizuka, Japan

[21] Appl. No.: 669,111

[22] Filed: Mar. 13, 1991

[30] Foreign Application Priority Data

Jul. 17, 1990 [JP] Japan .............................. 2-75732[U]

[51] Int. Cl.⁵ ............................................ B60R 19/24
[52] U.S. Cl. ..................................... 293/155; 293/154
[58] Field of Search ................................ 293/155, 154

[56] References Cited

U.S. PATENT DOCUMENTS

| | | | |
|---|---|---|---|
| 1,348,329 | 8/1920 | Stafford | 293/155 X |
| 1,406,828 | 2/1922 | Dyer | 293/155 X |
| 1,680,927 | 8/1928 | Yanss | 293/155 X |
| 1,734,758 | 11/1929 | Banschbach | 293/117 X |
| 4,422,680 | 12/1983 | Goupy | 293/154 X |
| 4,961,603 | 10/1990 | Carpenter | 293/155 X |
| 5,005,887 | 4/1991 | Kelman | 293/155 X |

FOREIGN PATENT DOCUMENTS

| | | | |
|---|---|---|---|
| 412152 | 8/1925 | Fed. Rep. of Germany | 293/155 |
| 0196848 | 9/1986 | Japan | 293/155 |

*Primary Examiner*—Dennis H. Pedder
*Attorney, Agent, or Firm*—McGlew & Tuttle

[57] ABSTRACT

A construction for mounting an automobile bumper to an automobile frame. Upwardly extending brackets are provided at tips of two side members of the frame. Threaded bores are formed on top surfaces of the brackets and threaded bores are formed on side surfaces of the side members of the frame. An upper and lower part of the bumper is provided with a first and second stay extending toward the frame. A threaded through hole is formed at a tip of each stay. A rear portion of the bumper is placed in abutment with a front surface of the brackets so as to place a tip of the first stay on the top surface of the bracket. A tip of the second stay is placed along the side surface of the side members. Screws are provided through the through holes in the first and second stays to engage the screws threadably in the threaded bores in the brackets and the side members respectively.

3 Claims, 1 Drawing Sheet

CONSTRUCTION FOR MOUNTING AN AUTOMOBILE BUMPER

FIELD OF THE N AND RELATED ART STATEMENT

The present invention relates to a construction for mounting an automobile bumper.

In FIG. 2, there is shown an automobile with a prior art bumper mounting construction. In this car, brackets b are fixedly secured to the tips of side members a of a frame, whereas L-shaped stays d are fixedly secured to the rear of the bumper c, and the stays d are, after superposed on the brackets b, threadably secured thereto with screws e. According to the prior art bumper mounting construction described above, mounting operations are complicated and troublesome because until the screws e are fixed in place, the bumper c must be supported and held horizontally.

OBJECT AND SUMMARY OF THE INVENTION

The object of the present invention is to provide a construction for mounting an automobile bumper which permits easy mounting operations.

The gist of the present invention consists in a construction for mounting an automobile bumper, in which a bracket which extend upwardly is provided at a tip of each of two side members of a frame; threaded bores are formed on the top surfaces of said brackets and further on the side surface of the tip of said side members, whereas the upper and lower parts of the bumper are provided with a first and a second stay extending backward, respectively; a through hole is formed at a tip of each stay; the rear of the bumper is placed in abutment with the front surface of the bracket so as to place the tip of said first stays on the top surface of said brackets, whereas the tip of said second stays is placed in juxtaposition with the side surface of said side members; screws pass through the holes in said first and second stays so as to engage the screws threadably in the threaded bores in said brackets and side members so that said bumper is mounted to said frame.

According to the present invention, the positioning of the bumper to a predetermined position can be accomplished without the effort of holding the bumper horizontally, so that the above described screwing is very easily achieved. Furthermore, because the bumper is supported surfacewise at each supporting location, sufficient support strength is ensured.

DETAILED DESCRIPTION OF A PREFERRED EMBODIMENT

Figure 1:
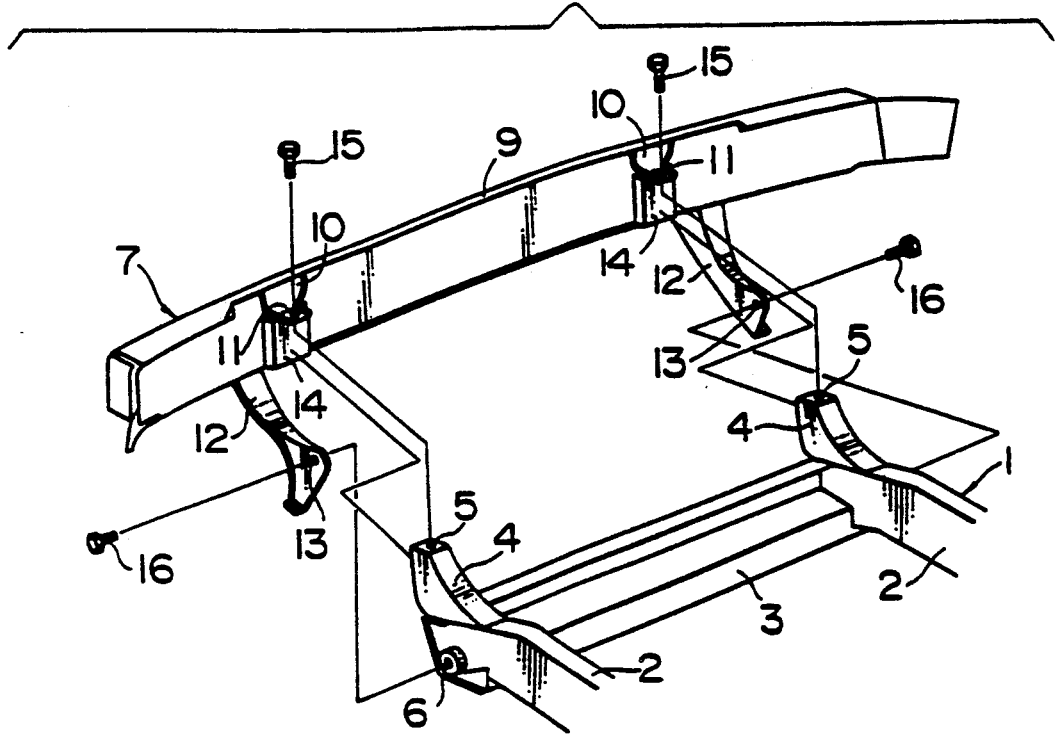
FIG. 1 is an exploded view in perspective of the automobile bumper mounting construction of the present invention.
Figure 2:
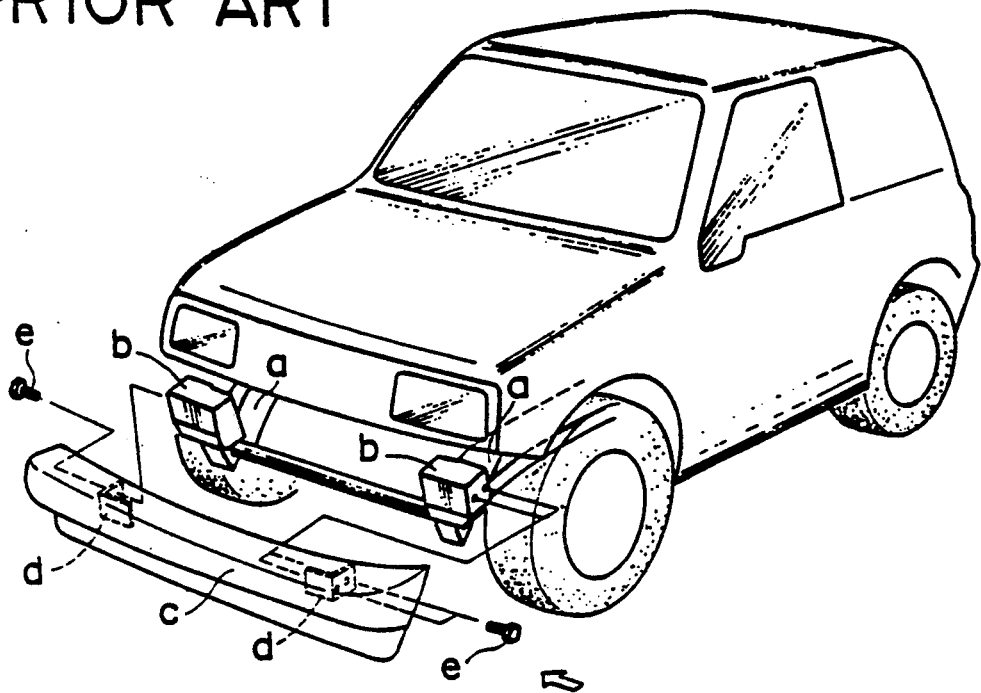
FIG. 2 is a perspective view of a conventional construction for mounting an automobile bumper.

In FIG. 1, there is shown an automobile bumper mounting construction according to the invention. In the frame 1 shown here, the front ends of two side frames 2 are connected to each other through a cross member 3. From each of the two front ends vertically extends a bracket 4. On the top surface of the brackets 4, there is formed a threaded bore 5. Also, a threaded bore 6 is formed on the outer surface of each front end of the two side frames 2.

Also, a bumper 7 is provided with a resin armor portion (not shown) and a metal reinforcement 9 located at the rear of the armor portion and extending along almost the entire width of the bumper. The reinforcement 9 is provided with a pair of stays (upper stays) 10 welded to the upper part thereof above a backing member 14. The upper stays 10 are bent sharply at their lower end and include a horizontally extending portion, extending extend backward. At the tip of these stays, there are formed a through hole 11 for a screw to pass through. The reinforcement 9 is also provided with a pair of stays 12 (lower stays) welded to the lower part thereof. The lower stays 12 also extend backward. A through hole 13 is formed also at the tip of these stays 12.

The bumper 7, thus constructed, is moved adjacent to the frame 1 in such a manner as the side members 2, 2 of the frame 1 are sandwiched between a pair of stays 12, 12 and the first stays 10, 10 are placed on the top surface of the brackets 4, 4, and the bumper is pushed along the surface in the direction of frame 1, so that the rear surface of the reinforcement 9 is located in abutment with the front surface of the brackets 4, 4.

The bumper 7 is thus positioned with respect to the transversal direction of the car body by means of the side surfaces of the side members 2, 2 and positioned with respect to the height through the top surfaces of the brackets 4, 4 so as to ensure its horizontality. It is also positioned longitudinally through the front surfaces of the brackets 4, 4.

The bumper 7, thus positioned, is subsequently fixedly secured to the frame 1 by putting screws 15 through the through holes 11 and threadably engaging them in the respective bores 5 and by putting screws 16 through the through holes 13 in the stays 12 and threadably engaging them in the bores 6 defined in the side members 2.

While this invention is described in connection with the preferred embodiment above, it is understood that the present invention is not restricted to the same, and all modifications and variations which would be apparent to a skilled person are deemed within the technical scope thereof.

I claim:

1. An automobile bumper mounting construction comprising: a first automobile side frame; a second automobile side frame; a first bracket connected to an upper front end of said first automobile side frame, side first bracket including a top surface defining a first vertically extending threaded bore, said first bracket including a front vertical surface; a second bracket connected to an upper front end of said second side frame, said second bracket including a top surface defining a second vertically extending threaded bore, said second bracket including a front vertical surface; a first horizontally extending threaded bore, defined by said first side frame, said first horizontally extending threaded bore including an opening side opposite said second side frame; a second horizontally extending threaded bore, defined by said second side frame, said second horizontally extending threaded bore including an opening side opposite said first side frame; a bumper including a first upper stay, connected to said bumper and including a first upper stay horizontally extending portion defining a first upper stay through hole, said first upper stay horizontally extending portion being in contact with said first bracket top surface with said first upper stay through hole aligned with said first bracket threaded bore; a second supper stay, connected to said bumper and including a second upper stay horizontally extending portion defining a second upper stay through hole, said second upper stay horizontally extending portion being in contact with said second bracket top surface with said second upper stay through hole aligned with said second bracket threaded bore; a first lower stay connected to said bumper, said first lower stay including a vertically extending portion defining a first lower stay through hole, said first lower stay through hole being aligned with said first side frame threaded bore; a second lower stay connected to said bumper, said second lower stay including a vertically extending portion defining a second lower stay through hole, said second lower stay through hole being aligned with said second side frame threaded bore; a first screw extending through said first upper stay through hole and engaging threads of said first bracket threaded bore for fixing said first upper stay to said top surface of said first bracket; a second screw extending through said second upper stay through hole and engaging threads of said second bracket threaded bore for fixing said second upper stay to said top surface of said second bracket; a third screw extending through said first lower stay through hole and engaging threads of said first horizontally extending threaded bore for fixing said first lower stay to said first side frame; and a fourth screw extending through said second lower stay through hole and engaging threads of said second horizontally extending threaded bore for fixing said second lower stay to said second side frame, a first backing member attached to said bumper and a second backing member attached to said bumper each of said first backing member and said second backing member include a rear face, said rear face of said first backing member abutting said front surface of said first bracket and said rear face of said second backing member abutting said front surface of said second bracket.

2. An automobile bumper mounting construction comprising: a first automobile side frame; a second automobile side frame; a first bracket connected to an upper front end of said first automobile side frame, said first bracket including a first bracket top surface defining a first bracket vertically extending threaded bore, said first bracket including a front vertical surface; a second bracket connected to an upper front end of said second side frame, said second bracket including a second bracket top surface defining a second bracket vertically extending threaded bore, said second bracket including a front vertical surface; a first horizontally extending threaded bore, defined by said first side frame, said first horizontally extending threaded bore including an opening side opposite said second side frame; a second horizontally extending threaded bore, defined by said second side frame, said second horizontally extending threaded bore including an opening side opposite side second side frame; a second horizontally extending threaded bore, defined by said second side frame, said second horizontally extending threaded bore including an opening side opposite said first side frame; a bumper including a lower bumper face; a first upper stay, connected to said bumper said first upper stay defining a first upper stay through hole, said first upper stay being positioned in contact with said first bracket top surface with said first upper stay through hole aligned with said first bracket vertically extending threaded bore; a second upper stay, connected to said bumper said second upper stay defining a second upper stay through hole, said second upper stay being positioned in contact with said second bracket top surface with said second upper stay through hole aligned with said second bracket threaded bore; a first lower stay connected to said lower bumper face, said first lower stay including a vertically extending portion defining a first lower stay through hole, said first lower stay through hole being aligned with said first horizontally extending threaded bore; a second lower stay connected to said lower bumper face, said second lower stay including a vertically extending portion defining a second lower stay through hole, said second lower stay through hole being aligned with said second side frame threaded bore; a first screw extending downwardly through said first upper stay through hole and engaging threads of said first bracket threaded bore for fixing said first upper stay to said top surface of said first bracket; a second screw extending downwardly through said second upper stay through hole and engaging threads of said second bracket threaded bore for fixing said second upper stay to said top surface of said second bracket; a third screw extending in a width direction of the automobile through said first lower stay through hole and engaging threads of said first side member threaded bore for fixing said first lower stay to said first side frame; and a fourth screw extending in a width direction of the automobile through said second lower stay through hole and engaging threads of said second side member threaded bore for fixing said second lower stay to said second side frame, said bumper includes a first backing member attached to said bumper and a second backing member attached to said bumper each of said first backing member and said second backing member include a rear face, said rear face of said first backing member abutting said front vertical surface of said first bracket and said rear face of said second backing member abutting said front vertical surface of said second bracket.

3. An automobile bumper mounting construction comprising: a first automobile side frame; a second automobile side frame; a first bracket connected to an upper front end of said first automobile side frame, said first bracket including a top surface defining a first bracket vertically extending threaded bore, said first bracket including a front vertical surface; a second bracket connected to an upper front end of said second automobile side frame, said second bracket including a top surface defining a second bracket vertically extending threaded bore, said second bracket including a front vertical surface; a first horizontally extending threaded bore, defined by said first side frame, said first horizontally extending threaded bore including an opening side opposite said second side frame; a second horizontally extending threaded bore, defined by said second side frame, said second horizontally extending threaded bore including an opening side opposite said first side frame; a bumper including a lower bumper face; a first upper stay, connected to said bumper and including a first upper stay horizontally extending portion defining a first upper stay through hole, said first upper stay horizontally extending portion being connected to said first bracket top surface with said first upper stay through hole aligned with said first bracket threaded bore; a second upper stay, connected to said bumper and including a first upper stay horizontally extending portion defining a first upper stay through hole, said first upper stay horizontally extending portion being connected to said second bracket top surface with said through hole aligned with said second bracket threaded bore; a first lower stay connected to said said lower bumper face, said lower stay including a vertically extending portion defining a first lower stay through hole, said through hole being aligned with said first side frame threaded bore; a second lower stay connected to said lower bumper face, said lower stay including a vertically extending portion defining a second lower stay through hole, said second lower stay through hole being aligned with said second side frame threaded bore; a first screw extending through said first upper stay through hole and engaging threads of said first bracket threaded bore for fixing said first upper stay to said top surface of said first bracket; a second screw extending through said second upper stay through hole and engaging threads of said second bracket threaded bore for fixing said second upper stay to said top surface of said second bracket; a third screw extending through said first lower stay through hole and engaging threads of said second side member threaded bore for fixing said first lower stay to said first side frame; and a fourth screw extending through said second lower stay through hole and engaging threads of said second side member threaded bore for fixing said second lower stay to said second side frame, said bumper including a first backing member attached to said bumper and a second backing member attached to said bumper each of said first backing member and said second backing member including a rear face, said rear face of said first backing member abutting said front surface of said first bracket and said rear face of said second backing member abutting said front surface of said second bracket.

* * * * *